US006554589B2

(12) United States Patent
Grapes

(10) Patent No.: US 6,554,589 B2
(45) Date of Patent: *Apr. 29, 2003

(54) FLEXIBLE TUBE PINCH MECHANISM

(75) Inventor: Robert Donald Grapes, Palmerston North (NZ)

(73) Assignee: Precision Dispensing Systems Limited (NZ)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/462,134
(22) PCT Filed: Jul. 2, 1998
(86) PCT No.: PCT/NZ98/00093
§ 371 (c)(1), (2), (4) Date: Dec. 30, 1999
(87) PCT Pub. No.: WO99/01687
PCT Pub. Date: Jan. 14, 1999

(65) Prior Publication Data
US 2002/0047099 A1 Apr. 25, 2002

(30) Foreign Application Priority Data
Jul. 3, 1997 (NZ) .................................. 328236

(51) Int. Cl.[7] .............................. F04B 43/08; F16K 7/04
(52) U.S. Cl. ...................................... 417/477.12; 251/7
(58) Field of Search ............................ 251/7; 417/476, 417/477.1, 477.9, 477.12

(56) References Cited

U.S. PATENT DOCUMENTS

| | | | | |
|---|---|---|---|---|
| 1,921,001 A | * | 8/1933 | Ohlson | 251/7 X |
| 2,197,995 A | * | 4/1940 | Crowley | 251/7 |
| 4,029,441 A | * | 6/1977 | Fischer | 417/477.12 |
| 4,071,039 A | * | 1/1978 | Goof | 251/7 X |
| 4,492,575 A | * | 1/1985 | Mabille | 251/7 X |
| 4,688,753 A | * | 8/1987 | Tseng et al. | 251/7 |
| 4,767,289 A | * | 8/1988 | Parrott et al. | 417/477.12 |
| 4,895,341 A | * | 1/1990 | Brown et al. | 251/7 X |
| 4,960,259 A | * | 10/1990 | Sunnavader et al. | 251/7 |
| 5,088,522 A | * | 2/1992 | Rath et al. | 251/7 X |
| 5,215,450 A | * | 6/1993 | Tamari | 417/477.12 X |
| 6,036,166 A | * | 3/2000 | Olson | 251/7 |

* cited by examiner

Primary Examiner—David A. Scherbel
Assistant Examiner—Eric Keasel
(74) Attorney, Agent, or Firm—Blakely Sokoloff Taylor & Zafman

(57) ABSTRACT

A pinch mechanism suitable for use as a valve or as part of a pump. The pinch mechanism comprises a housing (11) within which an elongate conduit element (12) is located. A conduit engagement member (13c) is retained within the housing (11) to be movable transverse to a longitudinal axis of the conduit element (12). The engagement member has an end portion (13d) which engages with the conduit element (12), this end portion (13d) having a cross-sectional dimension less than the lateral inner dimension of the conduit element (12), this lateral dimension being at right angles to the direction of movement of the engagement member (13c).

15 Claims, 3 Drawing Sheets

FLEXIBLE TUBE PINCH MECHANISM

BACKGROUND OF THE INVENTION

This invention relates to an improved flexible tube pinch mechanism.

Pinch valves comprised of a clamp mechanism operative to clamp a piece of flexible tubing are well known. Generally a clamp or plunger will squash the tubing flat against a surface to cut off the flow of fluid through the tube. When the plunger is released flow will resume due to pressure from the flowing fluid and (to some degree) by the elastic nature of the flexible tubing springing back into shape.

Pumps are also known which utilise a series of pinching operations working on a flexible tube to gradually pump fluid through in a desired direction. Such pumps and valves can be inefficient and generally limited in application due to the restraints of pressure or volume throughput.

SUMMARY OF THE INVENTION

It is an object of the present invention to provide an improved flexible tube pinch mechanism, the principles of which can be applied to valves or pumps, the pinch mechanism exhibiting better operating characteristics than known pinch mechanisms.

In a first broad aspect of the invention there is provided a pinch mechanism comprising a housing adapted to receive an elongate flexible conduit element and a conduit engagement means, the engagement means having an engagement portion with a cross sectional dimension less than an inner diameter of the elongate conduit element.

In a second broad aspect of the invention there is provided a pinch mechanism comprising a housing, said housing adapted to receive an elongate flexible conduit element and a conduit engagement means, the engagement means having an engagement portion with a cross sectional dimension less than an inner diameter of the elongate conduit element, wherein said elongate conduit element is constrained within said housing to limit lateral movement thereof.

DESCRIPTION OF THE PREFERRED EMBODIMENTS

Figure 1:
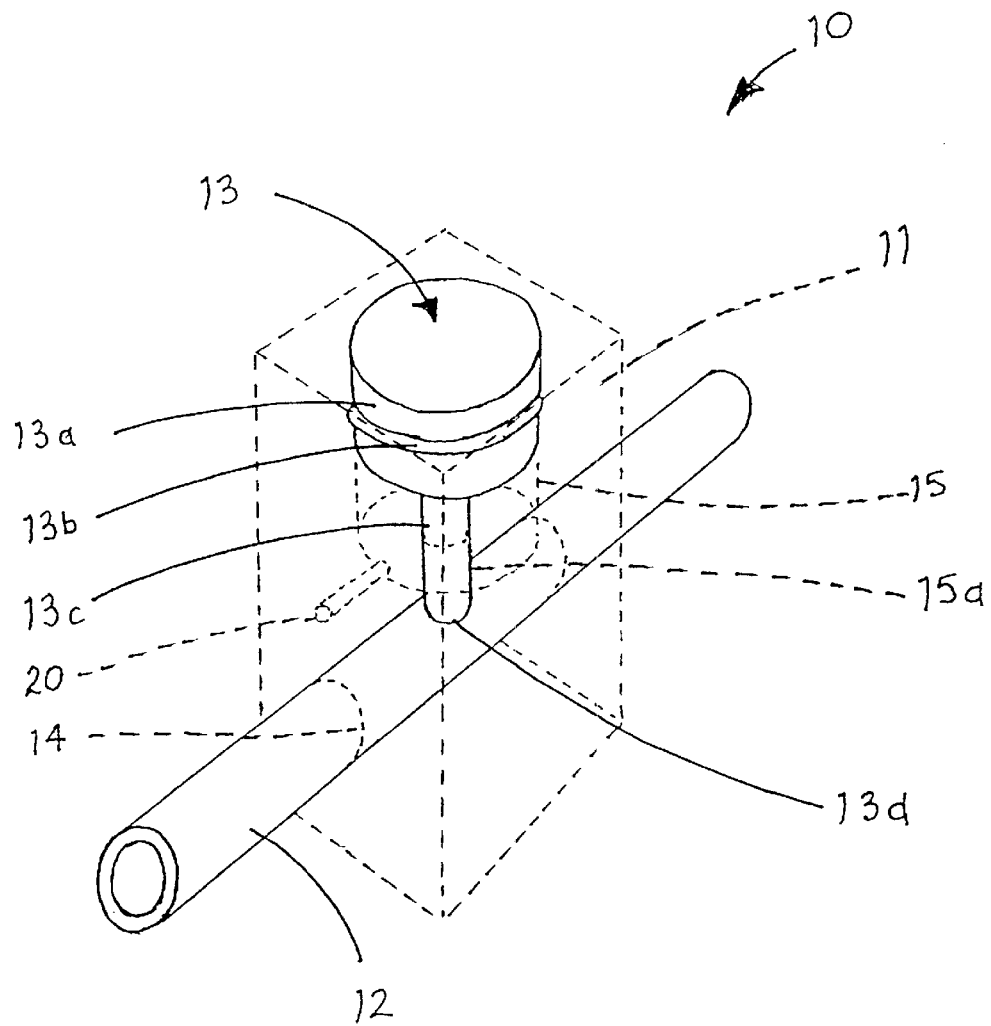
FIG. 1 is a general perspective view of a pinch mechanism according to the invention.

FIG. 1 illustrates a first form of the invention, that of a pinch valve 10. Pinch valve 10 principally includes a housing 11 (shown in dotted detail in FIG. 1), extending through which is a length of flexible conduit preferably in the form of a flexible silicon tube 12. Located transverse to the longitudinal axis of tube 12 is a piston arrangement 13. The piston arrangement includes a piston head 13a, a sealing gasket 13b located peripherally about the piston head and a conduit engagement member in the form of plunger 13c. Piston head 13a is slidingly located in a cylinder bore 15 formed in housing 11. Plunger 13c is slidingly located in plunger bore 15a which extends from cylinder bore 15 into tube tunnel 14 in which tube 12 is located.

Figure 3:
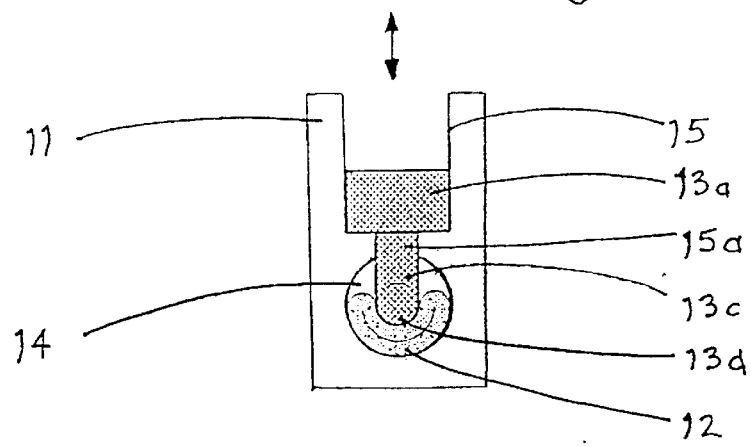
FIG. 3 is a sectioned end elevation view of the pinch mechanism relevant to both FIGS. 1 and 2.

In use, pressure is exerted upon cylinder head 13a by an external power means (such as a vacuum operated piston or an electrically powered solenoid) to cause plunger 13c to make contact with and collapse tube 12 within housing 11 (as shown in FIG. 3). The drawing in FIG. 3 shows how the tube 12 is collapsed into a sealed closed state, however, where only a restriction is required (say, in a pump arrangement) the tube will not be fully collapsed into a sealed closed state.

Alternatively a power means could be used to release a constant pressure on cylinder head 13a thereby causing the plunger 13c to be retracted from a collapsed tube 12. This will enable the tube to revert to its uncollapsed shape and permit fluid to flow therethrough.

The alternative configurations of the power means are applicable to different uses of the invention. A user can configure the pinch mechanism to be most appropriate for a given application.

To allow unhindered movement of the piston arrangement, a small bore or passageway 20 is provided in housing 11 leading from the cylinder bore 15 to the outside atmosphere. This bore 20 serves as a vent to enable piston head 13a to move within the cylinder bore 15.

As can be seen from FIG. 1, the width of plunger 13c is sized substantially less than the outside diameter of silicon tube 12. Put another way, the dimension of the inside of the tube at right angles to the direction of movement of the plunger is less than the cross-sectional dimension of the plunger.

Preferably plunger 13c has a spherical tube contacting end 13d which has a diameter equal to the outside diameter of tube 12 minus four times the wall thickness of tube 12.

A formula could be of the form:

$$D_L = D_P - 4x$$

where $D_L$ is the preferable width of plunger 13c (therefore the radius of plunger 13c will be $R = D_L/2$), $D_P$ is the tube 12 outer diameter and x is the wall thickness of tube 12.

The effect of the relative plunger 13c dimensions is best illustrated in FIG. 3. Plunger 13c causes the flexible tube 12 to "invert" thereby blocking fluid flow through the fluid flow passage formed by the internal bore of tube 12. The inversion of tube 12 causes a more effective seal than conventional pinch valves which squash the tube flat against a flat surface using a plunger or clamping member of a cross-sectional width at least as great as the outside diameter of tube 12.

Tube 12 extends through a constraining tunnel 14 in the housing 11 in a close or interference fit. The nature of the tunnel 14 is such that no significant lateral bulging of tube 12 may occur when compressed by plunger 13c. Tube 12 is constrained entirely within tunnel 14 and cannot expand in any direction greater than its initial outside diameter. A tube 12 constrained in such a way has a greater "spring back" characteristic and will regain its circular shape faster than a flatly pressed tube. This is especially relevant in low pressure systems where the fluid pressure will not aid or significantly assist in 'reinflating' the tube 12.

A flexible tube found within a conventional pinch valve cannot be constrained in the way described above as it requires lateral movement (unrestrained) in order to fully close. The complete inverted collapse of the "top" wall of tube 12 of the present invention onto the "bottom" wall creates what can be termed a "clown smiley face", the mouth of which is completely sealed as shown in FIG. 3.

Figure 2:
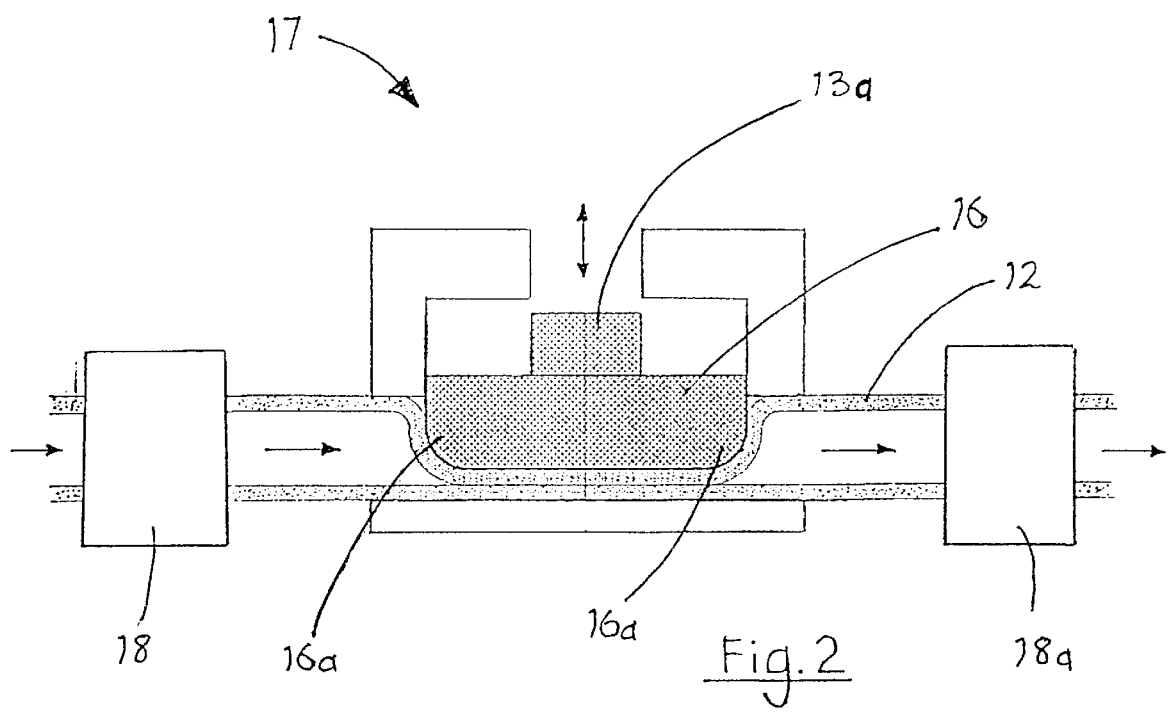
FIG. 2 is a sectioned side elevation view of a pinch mechanism according to the invention in the form of a pump.

FIG. 2 illustrates an embodiment of the invention when it is to be operated as a pump 17. The end elevation dimensions as shown in FIG. 3 remain substantially the same as the embodiment of FIG. 1 but the plunger 13c is now in the form of an elongate pinch member 16. The lateral width of pinch member 16 is still based on the equation considered above (namely, $D_L = D_P - 4x$), however the length (as seen in FIG. 2) of pinch member 16 allows a larger section of tube 12 to be inverted at one time.

When the pinch member 16 arrangement is placed between two non-return valve components 18 and 18a (allowing flow only in the direction of the arrows in FIG. 2) a pump is created which has a volumetric throughput directly proportional to the length of elongate pinch member 16. The volumetric displacement "per pump cycle" (that is, each time the tube 12 is compressed) is given by:

$$V = \pi D_I L + E$$

where V is the volume displaced, $D_I$ is the inner tube diameter and L is the length of member 16.

This is effectively the equation for a cylinder. There will, however, be a small difference created at the ends 16a of the elongate pinch member 16 which can be measured and entered as E in the equation (which could be positive or negative). If $D_I$, L and E are supplied in centimeters then the resulting V will be in milliliters. This can be converted to a flow rate per second by multiplying it by the number of cycles the pump completes every second.

Non-return valves 18 and 18a could be formed by two pinch valves as illustrated in FIG. 1. The sequence of activating each plunger within the valves 18 and 18a then becomes the crucial element in maintaining the desired direction of flow.

At the beginning of a cycle valve 18a will be closed. When the pipe is full of fluid, valve 18 will close and valve 18a will open. Pinch member 16 then inverts the tube 12 to pump fluid in the direction of valve 18a.

An advantage of the present pumping method is that it may be coupled to a system with no intermediate joins. Hygienic systems such as medical or food applications where bacteria can build up can benefit from simple and minimal piping connections. The pump of the present invention is also relevant to chemical processing as it can replace existing pump options where the aggressive nature of the chemical can be damaging. Materials can be selected which resist the chemicals but still continue to be flexible.

Figure 4:
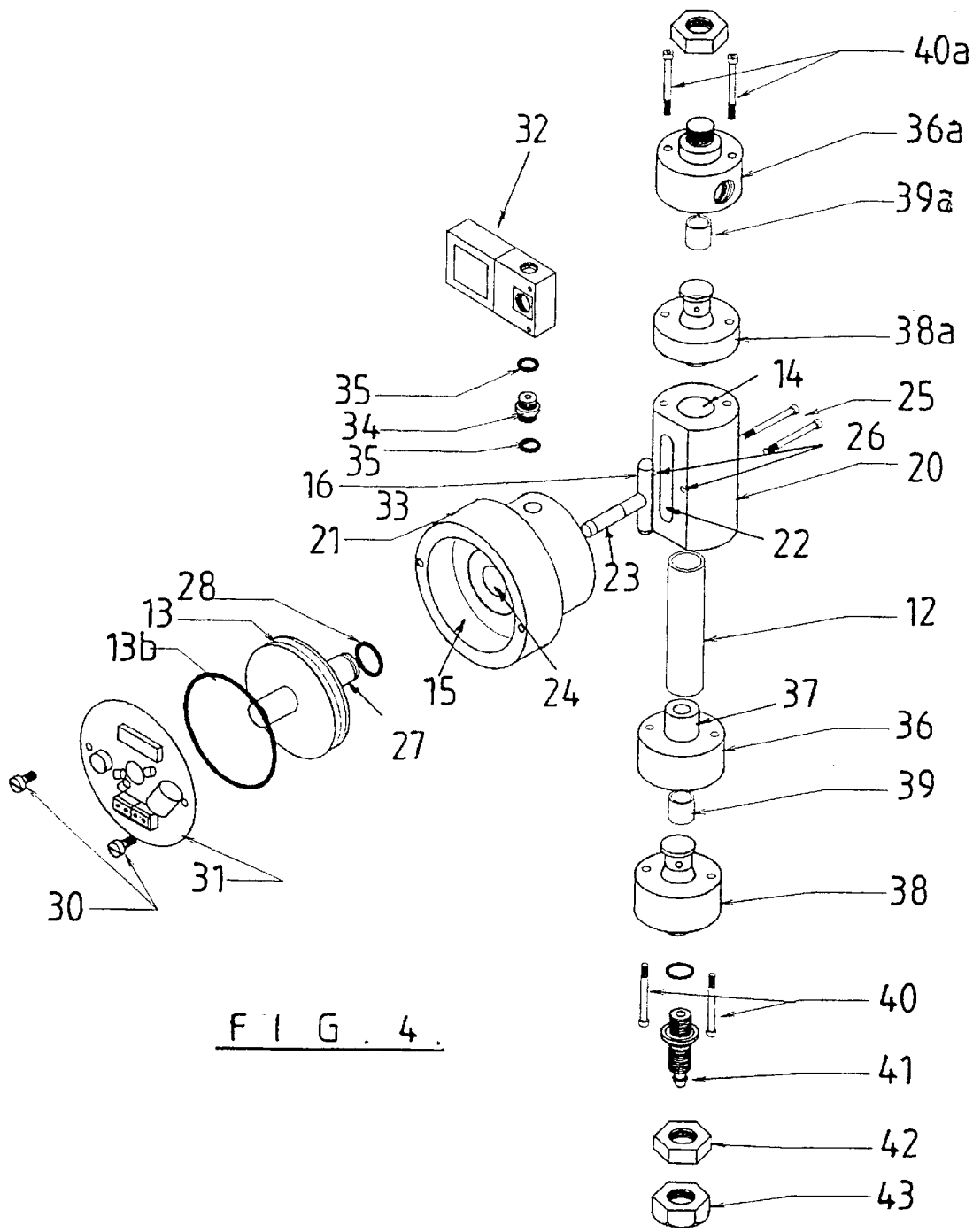
FIG. 4 is an exploded view of a further form of a pump incorporating the pinch mechanism of the present invention.

FIG. 4 provides an exploded view of a form of the pump illustrated in FIG. 2. Accordingly, like elements carry the same reference numerals.

As illustrated, the pump housing is formed in two parts being a pump body 20 and a drive cylinder 21. An elongate slot 22 is formed longitudinally in the pump body 20 for receiving the pinch member 16. Extending from the pinch element 16 is a shaft 23 which engages through bore 24 in the drive cylinder 21. Cap screws 25 are engagable through openings 26 in the pump body to screw into tapped openings (not shown) in the end of the drive cylinder 21 to combine the pump body 20 and drive cylinder 21 together.

The distal end of shaft 23 engages into a spigot 27 extending from piston 13. O rings 28 and 13b are fitted to spigot 27 and and piston 13 to provide a seal in bore 24 and cylinder 21 as the piston 13 moves back and forth within the piston chamber 15.

A printed circuit board assembly 31 is fitted to the end of the drive cylinder 21 by screws 30.

A microprocessor on this printed circuit board reads the position of the vacuum piston 13 via opto couplers and accordingly the operation of solenoid valve 32.

The solenoid valve 32 is fitted to a threaded opening 33 in the side wall of the drive cylinder 21 via a coupling 34 and O rings 35.

In this form of the invention the valves and 18 and 18a are mounted directly to the respective ends of the pump body 20. The inlet valve 20 comprises an inlet valve cover 36 which fits directly to the end of the pump body 20 there being a spigot 37 which engages into the end of the tube 12 within the tunnel 14. An inlet valve body 38 with valve band 39 engages into the inlet valve cover 36 and the whole assembly is fastened in place by cap screws 40 which engage through the valve body 38 and valve cover 36 into threaded openings (not shown) in the end of pump body 20. An inlet connector 41 with half nut 42 and clamp nut 43 are provided for coupling the pump to an inlet conduit.

Likewise, the outlet valve is provided by a valve body 38a which is mounted directly to the end of the pump body 20. An outlet valve cover 36a and valve band 39a are assembled together with the outlet valve body 38a by cap screws 40a.

FIG. 4 of the drawings, therefore, illustrates a practical commercial construction of a pump assembly using the "inflex" action of the pinch mechanism of the present invention.

As previously indicated, the tube is preferably of a flexible silicone type which is generally found to be long lasting and resistant to most types of fluids which could be expected to flow therethrough.

The pinch mechanism housing and 'piston' arrangement are most suitably constructed from hard-wearing plastic material. The housing may be formed in a number of parts as efficient production requires and several external appearances are possible.

The invention is open to modification as will be apparent to those skilled in the art. For example, the elongate pusher element 16 of the arrangement shown in FIGS. 2 and 4 could be replaced by a plurality of pushers of the type shown in FIG. 1. The plurality of pushers would be located side by side.

Also, the valves shown in the pump assembly of FIG. 2 or FIG. 4 could be provided by a pinch mechanism of the type shown in FIG. 1. The plungers could then all be linked to one motive force, eg via cams. This has the advantage of no valve being present in the product flow passage as all valve mechanisms would be external to the tube 12.

While in the drawings the tube 12 has been illustrated as being of round cross-section, other cross-sectional configurations could be used such as an oval tube.

The pump assembly as disclosed herein and incorporating the pinch mechanism of the present invention can readily provide an on-demand device without the need for diverter valves and bleeds.

The improved pinch mechanism according to the present invention thus provides a construction which allows accurate control over valve and/or pumping systems and may be used in many applications.

What is claimed is:

1. A pump comprising at least a flexible tubular element having an external surface and an internal bore which provides a flow passage through which a fluid flow can occur, a housing, at least part of the tubular element being located within the housing, and an engagement element having an engagement portion which, in use, is engageable with the external surface of a portion of the tubular element to cause said portion of the tubular element to invert into the bore of the tubular element and thereby restrict the flow passage, said portion of said tubular element being constrained within said housing to limit lateral movement thereof when the engagement portion engages with said portion of the tubular element, the engagement portion including a curved surface the diameter of which is such that in use the inversion of said portion of the tubular element can seal closed the fluid flow passage but said diameter is not greater than an external diameter of said portion of the tubular element minus four times the wall thickness of said portion of the tubular element, a non-return inlet valve associated with the tubular element to one side of said portion of the tubular element and a non-return outlet valve associated with the tubular element to the other side of said portion of the tubular element.

2. A pump as claimed in claim 1 wherein the tubular element is a flexible silicone tube.

3. A pump as claimed in claim 1 wherein the tubular element is resilient.

4. A pump as claimed in claim 1 wherein the engagement portion is elongate having a longitudinal axis parallel to the longitudinal axis of the tubular element.

5. A pump as claimed in claim 1, wherein said portion of the tubular element has a uniform wall thickness.

6. A pump as claimed in claim 1 further including a mover device for moving the engagement element.

7. A pump as claimed in claim 6 wherein the mover device is a piston mounted for reciprocating movement in a piston housing and further includes pressure control means for controlling a pressure to the piston.

8. A pump as claimed in claim 7 wherein the pressure control means includes a solenoid valve coupling the piston housing to a pressure source.

9. A pump as claimed in claim 1 wherein the housing includes a receiving chamber in which said tubular element is located.

10. A pump as claimed in claim 9 wherein the receiving chamber is configured to restrain the tubular element against lateral bulging.

11. A pump as claimed in claim 9 wherein the receiving chamber is a tunnel having a cross-sectional shape greater than an external cross-sectional shape of the tubular element.

12. A pinch mechanism as claimed in claim 11 wherein the housing has a passageway in which said engagement portion is slidingly engaged.

13. A pump comprising a flexible tubular element which provides a flow passage through which a fluid flow can occur, a housing, at least part of the tubular element being located within the housing, and an engagement element having an engagement portion which, in use, is engageable with a portion of the tubular element to deform the tubular element and thereby restrict the flow passage, said portion of said tubular element being constrained within said housing to limit lateral movement thereof when the engagement portion engages with the tubular element, the engagement portion including a curved surface the diameter of which is equal to an external diameter of said portion of the tubular element minus four times the wall thickness of said portion of the tubular element, a non-return inlet valve associated with the tubular element to one side of said portion of the tubular element and a non-return outlet valve associated with the tubular element to the other side of said portion of the tubular element.

14. A pump as claimed in claim 13 wherein the tubular element is located with a pump body which forms the conduit housing.

15. A pump as claimed in claim 13, wherein said portion of the tubular element has a uniform wall thickness.

* * * * *